United States Patent [19]

Koch et al.

[11] 4,421,293

[45] Dec. 20, 1983

[54] END CAP ASSEMBLY

[75] Inventors: Ulrich H. Koch, Chagrin Falls; Gerald A. Babuder, Mentor, both of Ohio

[73] Assignee: Whitey Co., Highland Heights, Ohio

[21] Appl. No.: 305,966

[22] Filed: Sep. 28, 1981

[51] Int. Cl.³ .......................... F16K 31/126; F16J 3/02
[52] U.S. Cl. ................................. 251/61.4; 251/61.2; 92/98 R; 92/128
[58] Field of Search .............................. 251/61.2, 61.4; 92/98 R, 128, 1

[56] References Cited

U.S. PATENT DOCUMENTS

| 962,736 | 6/1910 | Bice | 251/63.4 |
| 2,437,552 | 3/1948 | Quiroz | 251/61.4 |
| 3,354,897 | 11/1967 | Koch et al. | 251/61 X |

FOREIGN PATENT DOCUMENTS 744889  2/1956  United Kingdom .............. 92/98 R

Primary Examiner—Arnold Rosenthal
Attorney, Agent, or Firm—Fay & Sharpe

[57] ABSTRACT

An end cap assembly for a diaphragm type air actuator used selectively to open and close an associated shut-off valve. The assembly includes a cup-shaped nut threadedly received on the outer end of an actuator body. A cap member is received in the nut and includes a central stub extending outwardly therefrom through a central aperture in the nut bottom wall. A conical disc spring is operatively interposed between the nut bottom wall and the cap member so that when the assembly is installed on the actuator body, the disc spring is moved toward a flattened condition and continuously urges the cap member into retaining engagement with the actuator diaphragm. This then provides automatic clamping compensation for the cap member as to variations in the diaphragm thickness due to temperature or other environmental conditions. Both the nut and cap member stub include tool receiving means to facilitate threaded installation of the nut on the actuator body while preventing cap member rotation.

12 Claims, 4 Drawing Figures

END CAP ASSEMBLY

BACKGROUND OF THE INVENTION

This invention pertains to the art of fluid actuators and more particularly to a new and improved end cap assembly for such actuators.

The invention is particularly applicable to an end cap assembly for an air actuator used to selectively operate a fluid shut-off valve and will be described with continued reference thereto. However, it will be readily appreciated by those skilled in the art that the invention has far broader applications and may be adapted for use in a wide variety of environments where an end cap assembly is employed and where it is desired to place an axial clamping force on some component while eliminating any corresponding rotational forces.

The general types of actuators to which the present invention is particularly adapted for use are shown in the commonly assigned U.S. Pat. Nos. 3,312,446 and 3,354,897, the teachings of which are incorporated hereinto by reference. Both of these patents show actuators which include an actuator body having an end cap threadedly received over the outer end thereof. In both cases, a flexible diaphragm is fixedly captured between the outer or upper end area of the body and a portion of the cap. However, when the cap is installed, undesirable rotational or twisting forces are applied to the diaphragm which can adversely affect diaphragm operation or shorten its effective life. Moreover, these prior constructions do not provide means for compensating for variations in diaphragm thickness which may occur as a result of temperature or other environmental conditions. If the diaphragm thickness decreases, it may become loosened in its captured or clamped position and adversely affect actuator operation. The only means available to overcome this problem is to monitor continually the actuators and retighten the end cap when and as required. Such tightening, however, further increases the rotational or twisting forces applied to the diaphragm which, as previously noted, is highly undesirable.

It has, therefore, been considered appropriate to develop an actuator end cap construction which would prevent the application of rotational or twisting forces to the diaphragm as the end cap is installed. Also, such a construction should eliminate the necessity for constant monitoring to insure maintenance of proper adjustment.

The present invention contemplates a new and improved device which overcomes the foregoing problems and others and provides an end cap assembly which is simple in design, effective in use, which automatically compensates for diaphragm thickness variations, accommodates application of an effective axial clamping force against the diaphragm and which is readily adaptable to use in a wide variety of alternative applications and/or environments.

BRIEF DESCRIPTION OF THE INVENTION

The present invention contemplates the provision of a new and improved end cap assembly for an associated diaphragm type actuator which facilitates clamping of the diaphragm without the application of rotational or twisting forces thereto and which automatically compensates for variations in diaphragm thickness. The assembly is comprised of a generally cup-shaped nut, a cap member and a biasing means operatively interposed between the nut and cap member. The cap member is received in the nut and these two components are dimensioned relative to each other so that the cap member may be restained from rotation as the nut is fixedly secured to the body of an associated actuator. Also, the cap member is continuously urged into clamping engagement with the diaphragm under the influence of the biasing means.

More particularly, the nut includes a side wall portion and a bottom wall which has a centrally disposed aperture therethrough. The cap member includes a radial flange portion received within the nut and a centrally disposed axial stub extending outwardly from the flange portion through the aperture in the nut bottom wall. The flange portion includes means for engaging the diaphragm at least adjacent the outer peripheral margin thereof. In the preferred embodiment, the biasing means takes the form of a conical disc spring.

According to another aspect of the invention, the nut includes means which allow it to be threadedly mounted onto the outer end of an associated actuator body. The cap member stub includes means for preventing rotation of the cap member during threaded mounting of the nut. In the preferred construction, such means comprises tool receiving areas or flats.

According to still another aspect of the invention, the cap member stub advantageously includes an axial passageway therethrough communicating with the forward face of the flange portion. Depending upon the particular type of actuator valve with which the actuator is to be associated, this passageway may function as an exhaust port or may include appropriate means such as threads or the like for connecting a source of fluid pressure to the passageway.

In accordance with yet another aspect of the invention, the flange portion diaphragm engaging means comprises a band-like circumferential shoulder disposed adjacent the flange outer periphery.

The principal object of the present invention is the provision of a new and improved end cap assembly.

A more specific object of the invention is the provision of such an end cap assembly for use on a fluid operated actuator.

Another object is the provision of an end cap assembly which accommodates axial clamping of a diaphragm without imposing rotational or twisting forces thereto.

Yet a further object of the invention resides in the provision of an end cap assembly which automatically compensates for diaphragm thickness variations which may occur during use.

Still other objects and advantages for the invention will become apparent to those skilled in the art upon a reading and understanding of the following specification.

BRIEF DESCRIPTION OF THE DRAWINGS

The invention may take physical form in certain parts and arrangements of parts, preferred and alternative embodiments of which will be described in detail in this specification and illustrated in the accompanying drawings which form a part hereof and wherein.

DETAILED DESCRIPTION OF THE PREFERRED AND ALTERNATIVE EMBODIMENTS

Figure 1:
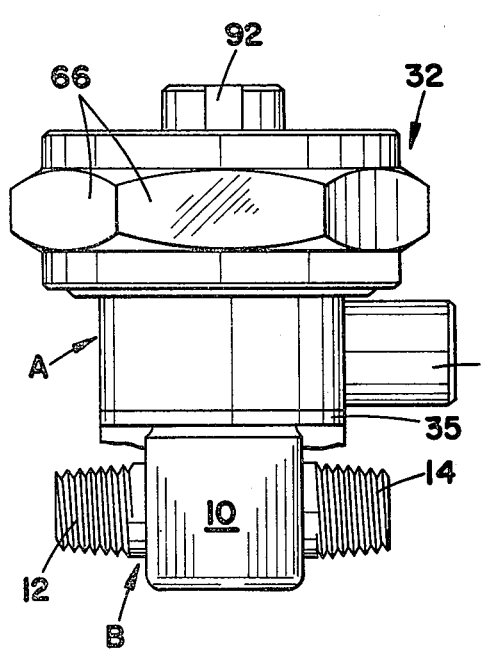
FIG. 1 is a side elevational view showing a preferred environment of use for the subject new end cap assembly.

Referring now to the drawings wherein the showings are for purposes of illustrating preferred and alternative embodiments of the invention only and not for purposes of limiting the same, FIG. 1 shows an operator or actuator A operatively installed on a fluid shut-off valve B for controlling fluid flow therethrough. In the arrangement shown, actuator A comprises an air operated device, although the overall concepts of the invention are deemed equally applicable to other environments. The type of valve and actuator environment shown is similar to those disclosed in commonly assigned U.S. Pat. Nos. 3,312,446 and 3,354,897, the teachings of which are incorporated hereinto by reference.

Figure 2:
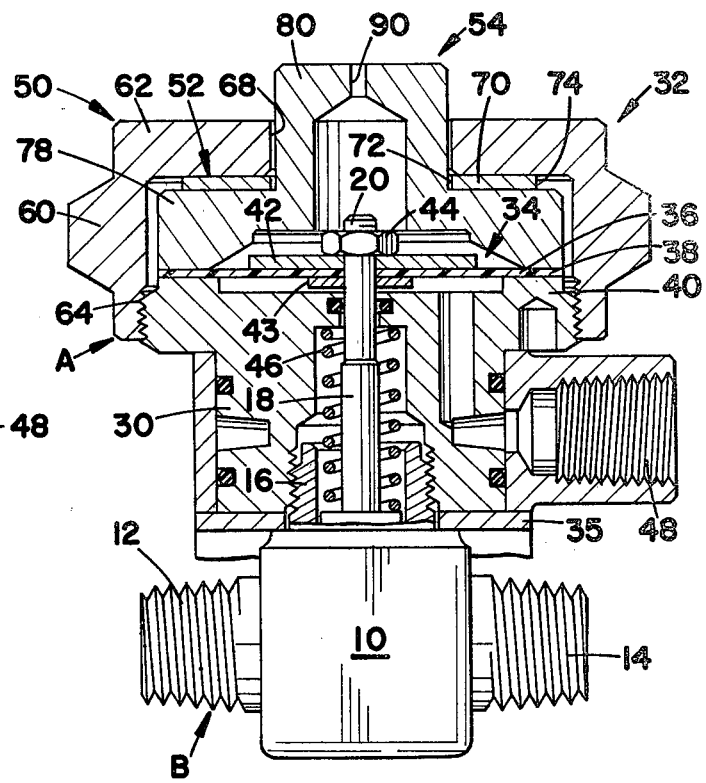
FIG. 2 is a side elevational view in partial cross-section showing the new end cap assembly installed on an associated actuator which, in turn, is installed on an associated valve.

More particularly, and with reference to FIG. 2, valve B includes a valve body 10 having a fluid inlet 12 and a fluid outlet 14 communicating with opposite sides thereof for conveying a system fluid through a conventional passage (not shown) in the valve body. The inlet and outlet each include convenient and known means for allowing the valve to be connected to a fluid system. Extending upwardly from the top surface of valve body 10 is a raised bonnet 16 having a central bore therein adapted to receive an elongated valve stem 18. The inner end of the valve stem includes a valve member (not shown) adapted to be reciprocated in the bore for selectively opening and closing the valve body passageway to fluid flow between inlet and outlet 12,14. A threaded area 20 adjacent the uppermost end of stem 18 allows convenient mounting to a diaphragm as will become apparent hereinafter.

Referring to both FIGS. 1 and 2, actuator A includes a body 30 threadedly mounted on raised bonnet 16 of the valve body, an end cap assembly 32 and a diaphragm assembly 34 (FIG. 2). It will be appreciated that other mounting relationships between actuator A and valve B may be advantageously utilized without in any way departing from the overall intent or scope of the invention. As shown, a valve assembly mounting bracket 35 is received over bonnet 16 in a secure captured relationship between the lower end face of body 30 and the upper end of valve body 10. Since this bracket does not comprise a part of the present invention, only a portion thereof has been shown in these two FIGURES.

With reference to FIG. 2, the diaphragm assembly is comprised of a thin circular flexible diaphragm 36 having one side of a marginal band 38 supported by a shoulder 40 on body 30. As shown, shoulder 40 is at the body outer end face, although other shoulder configurations such as those shown in U.S. Pat. Nos. 3,312,446 and 3,354,897 could also be used. A diaphragm support ring 42 is disposed on the upper or top side of diaphragm 36 and a washer 43 is disposed on the underside of the diaphragm. The diaphragm, support ring and washer are all received on valve stem 18 adjacent the upper end thereof. A nut 44 is received on valve stem threaded area 20 to retain the diaphragm assembly thereon. The particular actuator arrangement shown in FIG. 2 includes a compression spring 46 surrounding stem 18. One end of the spring is in operative communication with body 30 and the other end (not shown) is in operative communication with the valve member for continuously urging the valve member to a valve closed condition. Fluid pressure such as pneumatic pressure is selectively introduced into inlet opening 48 when it is desired to move the valve to an opened condition against the force of spring 46 in the opposite direction.

Figure 3:
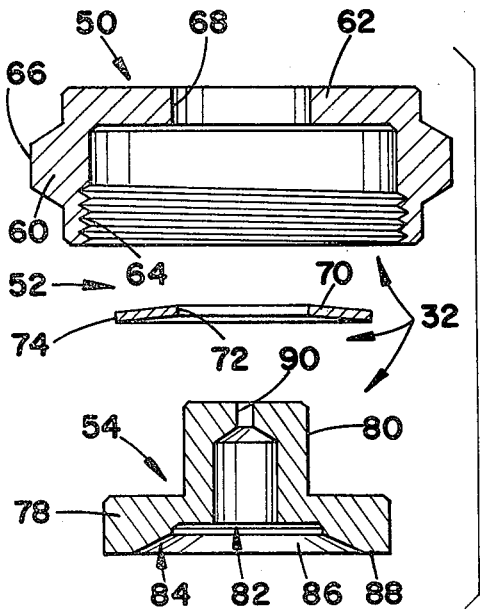
FIG. 3 is an exploded cross-sectional view of the subject new and improved end cap assembly; and, FIG. 4 is a partial side elevational view in cross-section showing a slightly modified construction for the cap member.

FIG. 3 best shows the details of the subject new cap assembly 32 and comprises a nut 50, a disc spring 52 and a cap member 54. More particularly, the nut has a generally cup-shaped configuration defined by a continuous side wall 60 and a bottom wall 62. The internal surface of the side wall is threaded as at 64 to accommodate threaded installation of assembly 32 on body 30 as is shown in FIGS. 1 and 2. Also, a plurality of tool receiving flats 66 are spaced circumferentially around the exterior of the nut side wall to accommodate cap assembly tightening on the body. Bottom wall 62 includes a centrally disposed aperture 68 therethrough to accommodate receipt of cap member 54.

Disc spring 52 has a frusto-conical body 70 including an inner diameter 72 and an outer diameter 74. As shown, the spring comprises a Belleville type spring washer with inner diameter 72 having generally the same dimension as aperture 68 in the nut bottom wall and with outer diameter 74 being slightly less than the nut inside diameter.

Cap portion 54 includes a radial flange portion 78 having a centrally disposed stub 80 extending axially outward therefrom. The flange portion is dimensioned for receipt in the cup-shaped nut and the stub is dimensioned for receipt through aperture 68 in a manner which will readily accommodate relative rotation between the two components for reasons which will become apparent hereinafter. A first circular recess 82 extends inwardly into the flange portion inner face and merges into a second circular recess 84 at a tapered side wall 86. This arrangement defines an axial diaphragm retaining or engaging shoulder 88 disposed circumferentially of the flange portion. An aperture 90 extends axially through stub 80 and through flange portion 78. In the end cap assembly shown in FIGS. 2 and 3, this aperture functions as an exhaust port during actuator operation. Also, at least a pair of tool flats 92 (FIG. 1) are spaced circumferentially of the stub to accommodate a conventional wrench or the like to prevent cap member rotation as nut 50 is threadedly engaged with body 30.

Although a wide variety of materials could be utilized in constructing cap assembly 32, the preferred arrangement shown contemplates use of aluminum for nut 50 and cap portion 54. Disc spring 52 is advantageously constructed of stainless steel. The specific material utilized does not, in and of itself, form a part of the present invention and may be altered as deemed necessary and/or appropriate to suit a particular application or environment.

With reference to both FIGS. 2 and 3, the cap assembly is assembled with disc spring 52 received over cap member stub 80 and with the cap member received in nut 50 so that stub 80 protrudes outwardly through aperture 68. The nut is threadedly mounted as by threads 64 onto the upper end of actuator body 30 as shown in FIG. 2. As the nut is threadedly advanced, an appropriate wrench or the like is used to engage tool flats 92 on stub 80 to prevent cap member rotation. Thus, the cap member is desirably limited to axial movement toward diaphragm assembly 34 with retaining shoulder 88 engaging diaphragm margin 38 on the opposite side thereof from body shoulder 40. Threaded advancement of the nut with prevention of cap member rotation continues until disc spring 52 is deflected by some predetermined amount or to a substantially flattened condition as is shown in FIG. 2.

With the foregoing installation, the diaphragm is securely retained as between shoulders 40,88 and disc spring 52 acts against the cap member to continuously urge it into retaining engagement with diaphragm margin 38. Stressing of the conical disc spring toward a flattened condition as shown thus provides a spring reserve so that the cap member will be urged axially and independently of nut 50 to automatically accommodate and compensate for thickness variations in the diaphragm which are typically caused by temperature or other environmental conditions to which the associated valve B is subjected. The conical disc spring is operatively interposed between the nut and cap member so that initially the area thereof generally adjacent inner diameter 72 engages the inner surface of nut bottom wall 62 and the area generally adjacent outer diameter 74 engages the inner surface of cap member flange 78. This then concentrates the reserve spring action on the cap member at the radial outer area of the flange portion, i.e., an area generally opposite from cooperating shoulders 40,88.

Because the cap member is limited to axial movement into retaining engagement with the diaphragm, the diaphragm is not subjected to rotational or twisting forces in the same manner encountered with prior actuator end cap designs and constructions. Elimination of these undesired forces extends diaphragm life as well as enhancing overall actuator operation. Moreover, the automatic compensating feature provided between the nut and cap member by disc spring 52 allows the actuator and diaphragm to be subjected to varying temperature or other environmental conditions without the necessity for periodically adjusting the cap to obtain a proper retaining force on the diaphragm. As a result, the time and manpower required to make periodic actuator inspections and adjustments are substantially reduced and/or eliminated. The foregoing advantages and improvements are significant, particularly when a high number of separate actuators are employed as in the case of many of the more complex fluid systems. In addition, in the normally closed valve and actuator arrangement of FIG. 2, the same end assembly 32 shown in FIG. 3 would typically be used in conjunction with a double acting actuator.

Figure 4:
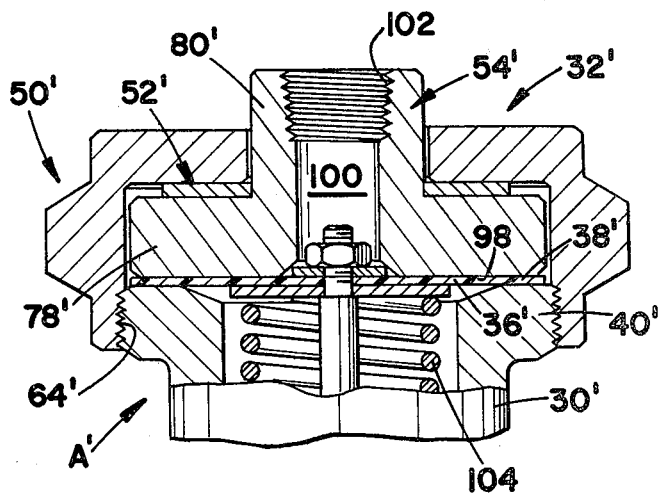

FIG. 4 shows a slight modification of the cap member which is typically employed in another type of actuator design. For ease of illustration and appreciation of this modification, like components are identified by like numerals with a primed (') suffix and new components are identified by new numerals.

In particular, FIG. 4 shows a radial flange portion 78' of cap member 54' as having a flat or planar end face 98. This end face engages diaphragm 36' over a larger area, including an area opposite from body shoulder 40' and diaphragm outer margin 38'. In addition, an axial passageway 100 extends through stub 80' into communication with end face 98. The passageway includes a threaded area 102 adjacent the outer end thereof for purposes of receiving a conventional fluid fitting for operatively connecting a source of fluid pressure thereto. While the stub is internally threaded as at 102, it will be appreciated that other types of connections could also be advantageously employed without in any way departing from the overall intent or scope of the present invention.

The arrangement of FIG. 4 is typically employed on an actuator for a normally open valve where actuator spring 104 continuously urges the valve stem upwardly to a valve opened condition. Fluid pressure is selectively introduced into passageway 100 against the diaphragm to overcome the force of spring 104 and move the valve member to a closed condition. The installation procedure for this modified end cap as well as the advantages received therefrom are identical to those hereinabove described with reference to FIGS. 2 and 3.

The invention has been described with reference to preferred and alternative embodiments. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. In a valve actuator of the type including an actuator body having one end thereof adapted for connection to and communication with a valve body such that an elongated valve operating stem protruding outwardly from the valve body extends from the actuator body one end toward an opposite open end; a flexible diaphragm disposed across the actuator body and adapted for operative connection to a valve operating stem adjacent the outermost end thereof, the diaphragm including a band-like margin adjacent the outer periphery thereof having one face supported adjacent the actuator body open end; means for introducing a fluid flow to at least one side of the flexible diaphragm for selectively causing diaphragm flexure whereby an associated valve actuating stem is linearly shifted for causing a valve member to be shifted between valve opened and closed conditions; and, an end cap threadedly secured to the actuator body for covering the open end thereof, the improvement comprising:

an end cap assembly including a cup-shaped nut including a side wall having an internally threaded area adapted for threaded receipt by said actuator body open end and a bottom wall having a centrally located aperture extending therethrough; a cap member received in said nut including a radial flange portion and a central stub, said flange portion including means adapted for engaging the outer face of the diaphragm margin area with said stub extending outwardly through said nut aperture; biasing means interposed between said nut bottom wall and said cap member flange for continuously urging said engaging means axially toward retaining engagement with the margin area other face, said biasing means comprising a conical disc spring received over said stub intermediate said nut bottom wall and said cap member flange portion; and, said nut and cap member being dimensioned such that they are rotatable relative to each other such that said cap member may be retained generally stationary as said nut is threadedly advanced onto an associated actuator body.

2. The improvement as defined in claim 1 wherein said stub includes tool receiving means externally of said nut adapted to receive a tool for retaining said cap member generally stationary as said nut is threadedly advanced onto the actuator body.

3. The improvement as defined in claim 1 wherein said stub includes an axial passageway therethrough adapted to communicate with the diaphragm.

4. The improvement as defined in claim 3 wherein said passageway includes means adapted for operatively connecting a source of fluid pressure therethrough.

5. The improvement as defined in claim 1 wherein said conical disc spring is positioned such that the smaller diameter portion is spaced toward engagement with said nut bottom wall and the larger diameter portion is spaced toward engagement with said cap member flange portion, threaded advancement of said nut onto an associated actuator body causing said disc spring to be compressed toward a flattened condition to establish a spring reserve and automatically compensate for any diaphragm thickness variations which occur during actuator use.

6. The improvement as defined in claim 1 wherein said engaging means comprises a circumferential shoulder disposed adjacent the outer periphery of said flange portion to extend generally axially thereof.

7. An end cap assembly for a remote actuator of the type having an actuator body including an open outer end with one side of a flexible diaphragm being supported adjacent the outer end and with an end cap covering the outer end in retaining engagement with the diaphragm, said end cap assembly comprising:
a cup-shaped nut having a side wall and a bottom wall which includes a centrally disposed aperture therethrough; a cap member received in said nut including a flange portion and an axial stub extending outwardly through said aperture, said flange including means for retainingly engaging the diaphragm of an associated actuator with said nut and end cap member being dimensioned so as to accommodate relative rotation therebetween; and, biasing means comprising a conical disc spring received over said stub intermediate said nut bottom wall and said cap member flange portion for placing a continuous axial biasing force against said cap member for urging it into continued retaining engagement with the diaphragm of an associated actuator to automatically compensate for thickness variations occurring in the diaphragm.

8. The assembly as defined in claim 7 wherein said nut is adapted to be threadedly mounted at the body outer end of an associated actuator, said stub including means for preventing rotation of said cap member during threaded advancement of said nut onto the associated actuator body.

9. The assembly as defined in claim 8 wherein said preventing means comprises distinct tool receiving means disposed externally of said nut bottom wall.

10. The assembly as defined in claim 7 wherein said stub includes an axial passageway adapted to communicate with the diaphragm of an associated actuator.

11. The assembly as defined in claim 7 wherein said engaging means comprises a circumferentially disposed axial shoulder adjacent the outer periphery of said flange portion.

12. The assembly as defined in claim 7 wherein said conical disc spring is disposed such that the smaller diameter portion is spaced toward engagement with said nut bottom wall and the larger diameter portion is spaced toward engagement with said cap member flange portion, mounting of said cap assembly on the body of an associated actuator causing said disc spring to be stressed toward a flattened condition and thereby establish a spring reserve to automatically compensate for thickness variations which may occur in the diaphragm.

* * * * *